United States Patent
Treiber

(10) Patent No.: US 7,055,314 B2
(45) Date of Patent: Jun. 6, 2006

(54) SYSTEM HAVING OPEN PARTICULATE FILTER AND HEATING ELEMENT, FOR CLEANING EXHAUST GASES FROM MOBILE INTERNAL COMBUSTION ENGINES

(75) Inventor: Peter Treiber, Monheim (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/835,205

(22) Filed: Apr. 29, 2004

(65) Prior Publication Data
US 2004/0221572 A1    Nov. 11, 2004

Related U.S. Application Data

(63) Continuation of application No. PCT/EP02/11677, filed on Oct. 18, 2002.

(30) Foreign Application Priority Data
Oct. 29, 2001 (DE) .......................... 201 17 659 U

(51) Int. Cl.
*F01N 3/00* (2006.01)

(52) U.S. Cl. .......................... 60/297; 60/300; 60/311; 55/DIG. 30

(58) Field of Classification Search .................. 60/297, 60/299, 300, 311; 55/DIG. 30; 422/174, 422/180
See application file for complete search history.

(56) References Cited

U.S. PATENT DOCUMENTS

| | | | |
|---|---|---|---|
| 4,686,827 A | | 8/1987 | Wade et al. |
| 4,718,926 A | | 1/1988 | Nakamoto et al. |
| 4,829,766 A | | 5/1989 | Henkel |
| 5,229,080 A | * | 7/1993 | Abe et al. .................... 422/174 |
| 5,436,216 A | * | 7/1995 | Toyao et al. ................. 502/439 |
| 5,672,324 A | * | 9/1997 | Okamoto et al. ........... 422/174 |
| 5,678,403 A | * | 10/1997 | Kanehara et al. ............. 60/309 |
| 5,701,736 A | * | 12/1997 | Morishima et al. ........... 60/297 |
| 5,846,495 A | * | 12/1998 | Whittenberger et al. .... 422/180 |
| 6,534,021 B1 | | 3/2003 | Maus |
| 6,540,816 B1 | * | 4/2003 | Allie et al. ................... 95/278 |

FOREIGN PATENT DOCUMENTS

| | | |
|---|---|---|
| DE | 197 04 147 A1 | 8/1998 |
| GB | 1 501 381 | 2/1978 |

* cited by examiner

*Primary Examiner*—Tu M. Nguyen
(74) *Attorney, Agent, or Firm*—Laurence A. Greenberg; Werner H. Stemer; Ralph E. Locher

(57) ABSTRACT

A system for cleaning exhaust gases of mobile internal combustion engines, particularly diesel engines, includes at least one open particulate filter having a freedom of flow of at least 20% and at least one heating element. The aim is to ensure, even at a position located far from the internal combustion engine, a continuous regeneration of the open particulate filter, which is distinguished by its low pressure loss and by its high degree of efficiency.

19 Claims, 4 Drawing Sheets

SYSTEM HAVING OPEN PARTICULATE FILTER AND HEATING ELEMENT, FOR CLEANING EXHAUST GASES FROM MOBILE INTERNAL COMBUSTION ENGINES

CROSS-REFERENCE TO RELATED APPLICATIONS

This application is a continuation, under 35 U.S.C. § 120, of copending International Application No. PCT/EP02/11677, filed Oct. 18, 2002, which designated the United States; this application also claims the priority, under 35 U.S.C. § 119, of German Patent Application 201 17 659.9, filed Oct. 29, 2001; the prior applications are herewith incorporated by reference in their entirety.

BACKGROUND OF THE INVENTION

Field of the Invention

The invention relates to a system having an open particulate filter and a heating element, for cleaning exhaust gases from mobile internal combustion engines, in particular from diesel engines.

It is known to use particulate filters made from a very wide range of filter materials such as, for example, ceramic monolith, silicon carbide, sintered metals or metallic, extruded or layered wound filters, to reduce the level of pollutant emissions and in particular particulate emissions from diesel engines. Since a relatively large number of particulates accumulate or are deposited in the filter while a diesel engine is running, from time to time it is necessary to regenerate the particulate filter in order to ensure that a particulate filter of that type and the correspondingly equipped diesel engine remain able to function for a prolonged period of time.

There are a number of known regeneration methods used for that purpose. The most frequent one is what is known as thermal regeneration, in which the particulates that have accumulated in the particulate filter are burnt. That usually requires exhaust-gas temperatures of over 600° C., but such temperatures are not always reached in modern diesel engines and in certain partial-load operating states. Consequently, the particulate filter regeneration cannot be sufficiently carried out or cannot be carried out at all "of its own accord". That leads to damage to the filters and/or the diesel engine or performance losses.

Also known are what are described as passive regeneration methods, in which additives that assist the regeneration and reduce the levels of particulate emissions are added to the fuel. Those additives, in particular, serve the function of lowering the exhaust-gas temperatures required for the regeneration. For that purpose, it is known to use fuel additives based on iron, cerium, manganese, zinc, platinum, copper or lead, in which case, by way of example, exhaust-gas temperatures of over 300° C. are sufficient for the filter material to be regenerated.

A further method relates to what is known as the CRT (continuous regeneration trap) system. In that case, the exhaust gas is first of all passed through an oxidation catalytic converter and then into a soot filter. The oxidation catalytic converter has the task of converting nitrogen monoxides (NO) which are contained in the exhaust gas into nitrogen dioxide ($NO_2$). An increased level of nitrogen dioxide has the advantage of causing redox reactions to take place in the downstream particulate filter, in which carbon (C) is oxidized to form carbon dioxide ($CO_2$) and the nitrogen dioxide ($NO_2$) is reduced to form pure nitrogen ($N_2$). The result thereof is that in particular carbon monoxide (CO) and long-chain hydrocarbons (HC) are almost completely converted even in a temperature range between 200° C. and 450° C. However, with those CRT systems, it should be ensured that only a virtually sulfur-free diesel fuel (less than 10 ppm of S) is used for that purpose, in order not to endanger the redox system described above.

In addition to the passive regeneration methods, active regeneration options are also known. In that case, the particulate filter is heated directly by a burner or by electrical measures, so that the particulate filter is periodically cleaned. That active supply of thermal energy takes place substantially as a function of the exhaust-gas temperature, the engine speed and/or the exhaust-gas backpressure upstream of the particulate filter. For example, if appropriate limit values for the exhaust-gas temperature, the engine speeds and/or the exhaust-gas backpressure are predetermined for the corresponding diesel engine, it is possible for the supply of thermal energy to be switched on or off accordingly. In that context, the main control variable is usually the exhaust-gas backpressure as a function of the respective engine speed and accordingly also the volumetric flow of exhaust gas. If the exhaust-gas backpressure rises, that is a sign that the particulate filter has a correspondingly higher level of loading and that regeneration should be carried out. If the exhaust-gas temperatures alone are insufficient to allow passive, if appropriate additive-assisted, regeneration to be carried out, it is necessary to additionally increase the temperature of the exhaust gas before it enters the particulate filter. That ensures that the particulates which have accumulated in the particulate filter (mainly soot) are converted into gaseous products (e.g. carbon dioxide ($CO_2$) or steam ($H_2O$)) again.

In terms of the specific configuration of particulate filters of that type, it is known to use honeycomb structures which have a layered structure of filter material. In that case, the layers of porous or highly porous material are stacked and/or wound in such a way that passages through which at least some of the exhaust gas can flow are delimited. Alternately closing off the passages in the vicinity of the inlet side and in the vicinity of the outlet side of the particulate filter forces the exhaust gas to flow through the porous walls made from filter material. The result of this is that on one hand the number of passages in a particulate filter of that type is limited, since the closure elements used to close off the passages cannot be smaller than a certain size, and that on the other hand the cross section of the particulate filter which is available for the exhaust gas to flow into is reduced to virtually half. In addition to requiring filters of that type to have a particularly large volume, that also leads to a very high exhaust-gas backpressure, irrespective of what quantities of particulates have already been stored in the particulate filter.

SUMMARY OF THE INVENTION

It is accordingly an object of the invention to provide a system having an open particulate filter and a heating element, for cleaning exhaust gases from mobile internal combustion engines, which overcomes the hereinafore-mentioned disadvantages of the heretofore-known devices of this general type and in which the filtering of the exhaust gas can be carried out with a significantly reduced exhaust-gas backpressure. Furthermore, the system should be able to ensure regeneration of the particulate filter irrespective of the operating state of the internal combustion engine (cold-starting phase, partial-load states, etc.) and the position in the exhaust system, in particular with regard to the distance from the internal combustion engine (e.g. in the underbody of an automobile).

With the foregoing and other objects in view there is provided, in accordance with the invention, a system for cleaning exhaust gases from mobile internal combustion engines, in particular from diesel engines. The system comprises at least one open particulate filter having a freedom of flow of at least 20%, and at least one heating element.

In this context, it should first of all be pointed out that in principle it is possible for any type of mobile internal combustion engine which produces particulate impurities or the like in the exhaust-gas stream to be connected upstream of the system according to the invention. This also applies, for example, to spark-ignition or gas engines. The at least one heating element is based on the principle of resistance heating, with a current flowing through an electrically conductive material at least from time to time. The resistance generates heat which is dissipated to the environment through the surface of the heating element. In this context, heat transfer from the heating element to the exhaust-gas stream flowing past the heating element is preferred. In principle, therefore, it is possible for the material to be used to be electrically conductive metallic or ceramic materials, which may generally be constructed in the form of wires, fabrics, sintered bodies, metal sheets, grids or the like.

The particulate trap, unlike the partially closed filter systems described in the introduction, is open, since there are no blind flow alleys. This property is described by the fact that there is a freedom of flow of at least 20%. In this context, the term freedom of flow means that in any desired cross section it is possible to see through at least 20% of the area, i.e. substantially continuously without any internal obstacles, such as flow-guiding surfaces or the like. In other words, when a particulate filter of this type is viewed from the end side, it is possible to at least partially see through the passages, provided that the internals are all installed in approximately the same position, i.e. are aligned one behind the other. This is typically the case for honeycomb bodies made from at least partially structured sheet-metal layers. However, in the case of internal fittings which are not aligned with one another, the freedom of flow does not necessarily mean that it is actually possible to see through part of a honeycomb body of this type. In order to explain the openness, it can be stated at this point, by way of example, that with a particulate trap having a passage density of approximately 600 cpsi (cells per square inch), for example, with a hydraulic diameter of 0.08 mm and a freedom of flow of 20%, an area through which it is possible to see freely of more than 0.1 mm$^2$ is provided. In this case, the freedom of flow is advantageously at least 40% or even at least 60%. The result of this configuration is that the exhaust-gas backpressure which builds up upstream of the particulate filter is significantly reduced. Since there are no closed passages in the inlet region of the particulate trap, the entire inlet surface area or the entire number of passages also serves to receive the incoming exhaust-gas stream. It also follows from this that a significantly increased surface area which is used to filter the exhaust-gas stream is provided.

As a further explanation, it should be added that a particulate filter can be referred to as being open if in principle particulates can flow through all of it, specifically even particulates which are significantly larger than the particulates that are actually to be filtered out.

This means that a filter of this type cannot become blocked even in the event of an agglomeration of particles during operation. One suitable method for measuring the openness of a particulate filter is, for example, to test the maximum diameter of spherical particles which can still trickle through a filter of this type. In the present applications, a filter is open in particular if spheres with a diameter of greater than or equal to 0.1 mm can still trickle through, preferably spheres with a diameter of over 0.2 mm, and in particular spheres with a diameter of more than 0.3 mm.

In the event of the exhaust-gas stream that flows through the passages coming into contact with the particulate filter, the soot particulates or the like contained in the exhaust gas are accumulated, stored or directly regenerated. Direct regeneration takes place, for example, if the required reaction partners are already present in the vicinity of the location where the soot particulates accumulate. Otherwise, the particulate trap serves to lengthen the residence time of the soot particulates which are to be converted in the particulate trap, until the exhaust-gas stream flowing through provides the required reaction partners (nitrogen dioxide, oxygen, etc.). The temperatures required for the regeneration are provided by the exhaust gas itself, the latter if appropriate having previously been heated through the use of the at least one heating element to temperatures of over 300° C., in particular over 500° C.

In accordance with another feature of the invention, the at least one particulate filter has at least one honeycomb body made from at least partially structured layers including at least one metal foil and at least one filter layer, which are disposed in such a way that passages through which the exhaust gas can flow are formed. The metal foils in this case preferably have a thickness of less than 50 μm, in particular less than 30 μm and advantageously even less than 15 μm. In this way, the surface area-specific heat capacity of the particulate filter is reduced, so that in particular in the cold-starting phase of the internal combustion, engine thermal energy which is required, for example, for the regeneration of the stored soot particulates, is not withdrawn unnecessarily from the exhaust gas. The filter layer substantially includes a fiber material which is joined, for example, to form a woven or knitted fabric. Alternatively, it is possible, for example, to use known sintered materials or the like which are suitable for storing particulates or impurities that occur in exhaust gases of this type for this purpose. The filter layers in this case have a thickness of preferably less than 3 mm, in particular less than 1.5 mm, and preferably less than 0.5 mm.

With regard to the number of passages which a honeycomb body of this type has, it is advantageous to provide passage densities (number of passages per unit cross-sectional area) in the range from 50 cpsi to 1500 cpsi (cells per square inch), in particular in a range between 200 cpsi and 1000 cpsi. As the passage density increases, an increasing surface area of the honeycomb body is generated, which can come into contact with the exhaust gas flowing past. In this respect, it is possible in this way to increase the efficiency of a particulate filter of this type to over 98%. In this context, the efficiency describes the ratio of the soot particulates or impurities produced to the converted or stored soot particulates or impurities. In other words, this means that only 2% of the soot particulates which are generated by the internal combustion engine are still in the exhaust gas after it has flowed through the proposed system. In this context, it is not absolutely imperative that very large numbers of soot particulates be stored, but rather this represents a combination of the conversion and storage efficiency of the particulate filter.

In accordance with a further feature of the invention, the at least one filter layer has a mean porosity of at least 70%, in particular at least 85% and preferably greater than 95%. In the present context, the term mean porosity is to be understood as meaning that the filter layer has openings, pores, free spaces, voids or the like, the dimensions of which are such that they form at least 70% of the unit volume of the filter layer. Due to the fact that the filter layer has a generally irregular structure of the fibers, in this context what is meant is a mean porosity over the filter layer through which the exhaust gas can flow. For example, if the filter layer includes a plurality of different materials and/or porosities, what is meant in this context is also a mean value for these several components. The porosity has a crucial influence on the storage or accumulation procedures, with particulates having a size in the range between 20 nm and 100 nm preferably being converted using particulate filters with a porosity of between 80% and 90%, whereas a higher porosity is used, for example, in the case of larger particulates. This stems from the different accumulation mechanisms, in particular with regard to the diffusion processes which take place.

In accordance with an added feature of the invention, the at least one metal foil has a structure, which is preferably provided with openings and/or diverting surfaces that divert partial exhaust-gas streams toward the at least one filter layer. In this respect, the particulates contained in the partial exhaust-gas streams are diverted by the internal fittings (openings and/or diverting surfaces) which are substantially disposed in the interior of the passages toward the porous or highly porous filter material, where they stick to or in the filter layer by being intercepted and/or by impacting. These internal fittings in this case produce pressure differences in adjacent passages, and therefore an improved filtration effect is recorded due to the fact that the pressure differences balance themselves out substantially automatically. The openings in the at least one metal foil ensure what are known as "communicating" passages, with the partial exhaust-gas streams at least from time to time flowing through different passages as they flow through the particulate filter. The openings preferably have a diameter of from 2 mm to 6 mm. The diverting surfaces in this case may have different structures, in particular as small vanes, protuberances, humps, studs or the like. The primary purpose of the structure of the metal foil is to space adjacent filter layers apart from one another and to form passages between them, with the structure height and structure length substantially defining the shape and number of the passages in the honeycomb body.

In accordance with an additional feature of the invention, the at least one heating element is disposed in the interior of the particulate filter. This is realized, for example, in such a way that a conductor through which an electric current can flow is disposed in the interior of the particulate filter. This conductor may, for example, be a metal foil, a wire, a zone or disk of the particulate filter. In order to realize a predeterminable current path, it is possible, for example, for the filter layer to be made substantially from an electrically nonconductive, in particular ceramic material. The electrical heating element is connected to a voltage source which can be switched on or off as a function of certain parameters (exhaust-gas backpressure, engine speed, exhaust-gas temperature, etc.).

In accordance with yet another feature of the invention, the at least one heating element is constructed as a separate heating disk which, as seen in the flow direction of the exhaust gas, is connected upstream of the at least one particulate filter. What this means is that the exhaust gas which is to be purified or cleaned is first of all passed through the heating element before it is then fed to the at least one particulate filter. The heating disk may in this case be disposed directly at or ahead of the particulate filter, in a form-locking manner, and the two components may under certain circumstances even have common components (e.g. metal foils, casing, etc.). A form-locking connection is one which connects two elements together due to the shape of the elements themselves, as opposed to a force-locking connection, which locks the elements together by force external to the elements. However, it is also possible for the heating element which has a disk-shaped structure to be disposed at a certain distance upstream of the particulate filter, in which case the distance (from the outlet side of the heating disk to the inlet side of the particulate filter) is preferably less than 50 mm, in particular less than 30 mm. In this case, it is likewise preferable for the heating disk to have a honeycomb structure with passages through which an exhaust gas can flow.

In accordance with yet a further feature of the invention, in the case of an embodiment of the heating element as a separate heating disk which is connected at a certain distance upstream of the particulate filter, it is advantageous for the heating element, that is constructed as a heating disk, to be supported against the at least one particulate filter. For this purpose, in particular supporting pins are provided, which at least partially project into inner regions of the heating element and/or into the passages of the particulate filters. In order to avoid an undesired flow of current to the particulate trap, supporting pins of this type are preferably provided with an insulation constructed for example, as a ceramic coating. Furthermore, it is also possible for supporting pins of this type to be disposed at the periphery or the casing of the heating element and/or the particulate filter. Combinations of these various embodiments of the supporting pins may also be advantageous.

In accordance with yet an added feature of the invention, the heating element, which is constructed as a heating disk, has a length that is less than 60% of the axial extent of the at least one particulate filter, in particular less than 40% and preferably less than 20%. In view of the fact that a heating disk of this type provides a very large surface area per unit volume, which serves to heat the exhaust-gas stream flowing past, the heating disk can have a very narrow structure, so that the system may even be integrated in an exhaust-gas system under restricted spatial conditions. The length of the heating disk in this case is advantageously at most 50 mm, in particular less than 30 mm and preferably even less than 10 mm.

In accordance with yet an additional feature of the invention, the at least one particulate filter and the at least one heating element together have a total volume which is less than 80% of a displacement volume of the internal combustion engine, in particular less than 50% and preferably less than 10%. It is known that the exhaust gas from the internal combustion engine is produced in combustion chambers or cylinders as a result of combustion of a fuel/air mixture. Known internal combustion engines are known to have 2, 4, 5, 6, 8 or 12 cylinders of this type, with all of the cylinders together having a displacement volume. For standard passenger automobiles, the displacement volumes are, for example, between 1.2 and 4.2 l, while in the case of motorcycles the displacement volume is approximately 0.25 to 1.5 l. Accordingly, the system proposed herein has a total volume which is significantly smaller than the displacement volume of the internal combustion engine. In this context, in particular when the system is disposed close to the engine, it is possible for the total volume, under certain circumstances, to be reduced still further, so that it amounts to less than 1% of the displacement volume. The total volume in this context refers to the sum of the passage walls and the passages of the particulate filter and of the heating element. In particular, in view of the restricted spatial conditions, in this context it is particularly advantageous for the at least one particulate filter and the at least one heating element to be integrated in a common casing.

In accordance with again another feature of the invention, the at least one heating element is, at least in part, provided with a catalytically active, in particular oxidizing, coating. This in particular makes it possible to promote regeneration using the CRT principle, since the upstream heating element acts as an oxidation catalytic converter, with sufficient nitrogen dioxide being provided in the downstream particulate filter. In this respect, this system represents a particularly space-saving, highly efficient system which reacts very dynamically. In this case, the at least one heating element can, if appropriate, be constructed in disk style, with catalytically actively coated and uncoated disks being provided in the direction of flow.

In accordance with a concomitant feature of the invention, it is proposed that the at least one particulate filter and/or the at least one heating element be disposed at a distance of greater than 0.7 m from the internal combustion engine. In this context, the distance is to be understood as meaning in particular the length which the exhaust-gas stream in the exhaust pipe is required to travel from the cylinders of the internal combustion engine to the inlet into the heating element and/or the particulate filter. In particular, if the spatial conditions in the region close to the engine are very restricted in motor vehicles, it may sometimes be necessary for the system for filtering the exhaust-gas stream to be moved, for example, into the underbody. In this case the system according to the invention, in these positions which are well away from the engine, can still provide virtually continuous regeneration of the filter or targeted cyclical regeneration, since the required exhaust-gas temperature can be generated through the use of the at least one heating element. In this case, only very small particulate filters are required.

Other features which are considered as characteristic for the invention are set forth in the appended claims, in which the features recited there may occur individually or in any desired and appropriate combination with one another.

Although the invention is illustrated and described herein as embodied in a system having an open particulate filter and a heating element, for cleaning exhaust gases from mobile internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
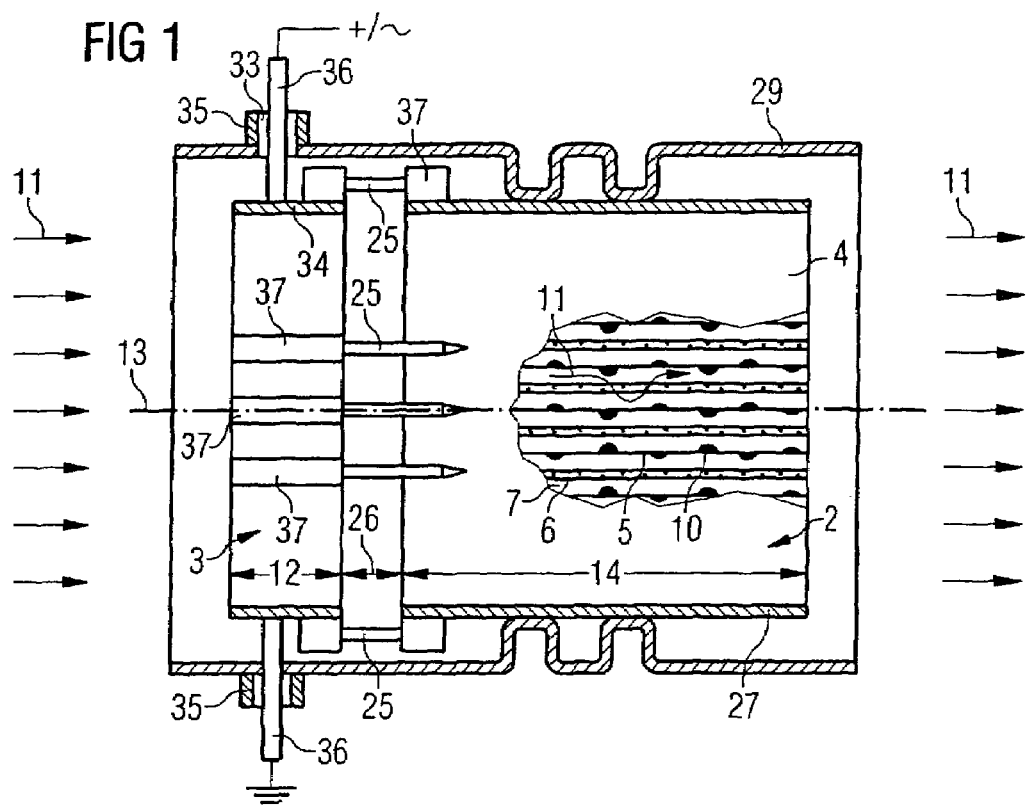
FIG. 1 is a diagrammatic, partly broken-away, sectional view of an embodiment of a system according to the invention with a heating element and an open particulate filter.

Referring now to the figures of the drawings in detail and first, particularly, to FIG. 1 thereof, there is seen a diagrammatic and sectional illustration of an embodiment of a system according to the invention which is integrated in an exhaust pipe 29. The system according to the invention includes a heating element 3 and an open particulate filter 2 connected downstream thereof, as seen in a flow direction 11. The open particulate filter 2 includes a honeycomb body 4, which is surrounded by a casing 27, through the use of which the particulate filter 2 is secured in the exhaust pipe or installation 29. The honeycomb body 4 includes a plurality of metal foils 5 and filter layers 6, which are disposed in such a way that passages 7 through which an exhaust gas can flow are formed. The metal foils 5 are provided with diverting surfaces 10 which divert partial exhaust-gas streams toward the filter layers 6 and/or through the latter. The illustrated particulate filter 2 has an extent 14, in the direction of an axis 13, which is constructed to be longer than a length 12, in the direction of the axis 13, of the heating element 3 which has a disk-shaped structure.

The heating element 3 is held at a distance from the particulate filter 2 through the use of supporting pins 25, with a gap being formed between the heating element 3 and the downstream particulate filter 4. This gap between the heating element 3 and the particulate filter 2 covers a distance 26 which is preferably constructed to be less than 30 mm. The supporting pins 25 may, in this case, be distributed uniformly over the casing 27 or a tubular casing 34 which delimits the heating element 3. Furthermore, it is also possible for supporting pins 25 to extend into inner regions of the particulate filter 2 and of the heating element 3.

In order to avoid undesired flows of electrical current from the heating element 3 to the particulate filter 2, the supporting pins 25 have an electrical insulation 37. Current is supplied to the heating element 3 through the use of electrodes 36 which are led through an aperture 33 in the exhaust pipe 29 and are brought into contact with the heating element 3. In order to prevent exhaust gas from escaping through the apertures 33, these apertures are provided with seals 35, which are preferably likewise made from an electrically insulating material, such as ceramic. The illustrated heating element 3 may, for example, be constructed as an extruded monolith, with heating of the heating element 3 being effected through the use of a current flowing through it, so that the exhaust gas which flows through the heating element is preferably heated to temperatures of over 300° C., in particular over 500° C.

Figure 2:
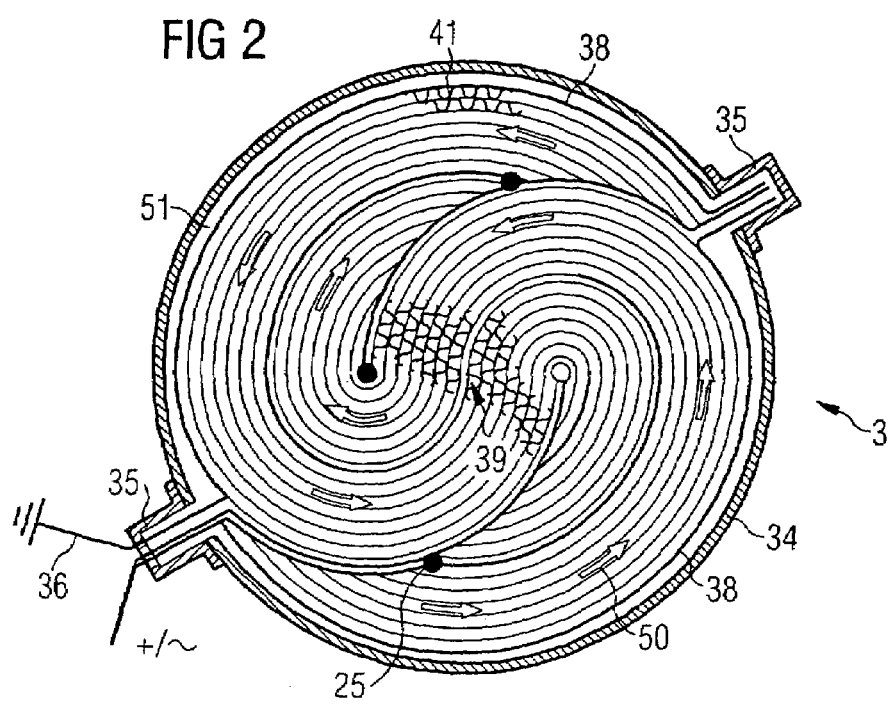
FIG. 2 is a partly-sectional, end-elevational view of an embodiment of a heating element.

FIG. 2 diagrammatically depicts an end-elevational view of an embodiment of a heating element. The heating element 3 has a cell structure 39 with a multiplicity of cells 41. The cell density in this case is preferably between 100 and 1200 cpsi (cells per square inch). Current is supplied through the use of the electrodes 36, which are guided to the cell structure 39 through the seal 35. The cell structure 39 has holders 38, which are preferably made from a thermally insulating material, so that predeterminable current paths 50 are generated. In the illustrated embodiment, current is taken off through the same seal 35 with which it is supplied, with the opposite seal 35 being used only to fix the shell 38. The honeycomb structure 29 in this case is positioned in the tubular casing 34 in such a way that an air gap 51 is formed between the cell structure 39 and the tubular casing 34, ensuring that current does not flow through the tubular casing 34. Furthermore, FIG. 2 shows uniformly distributed supporting pins 25 which are preferably connected to the holders 38. The holders 38 preferably have a reinforced structure, so that the support provided for the heating element 3 through the use of the supporting pins 25 provides a particularly stable structure.

Figure 3:
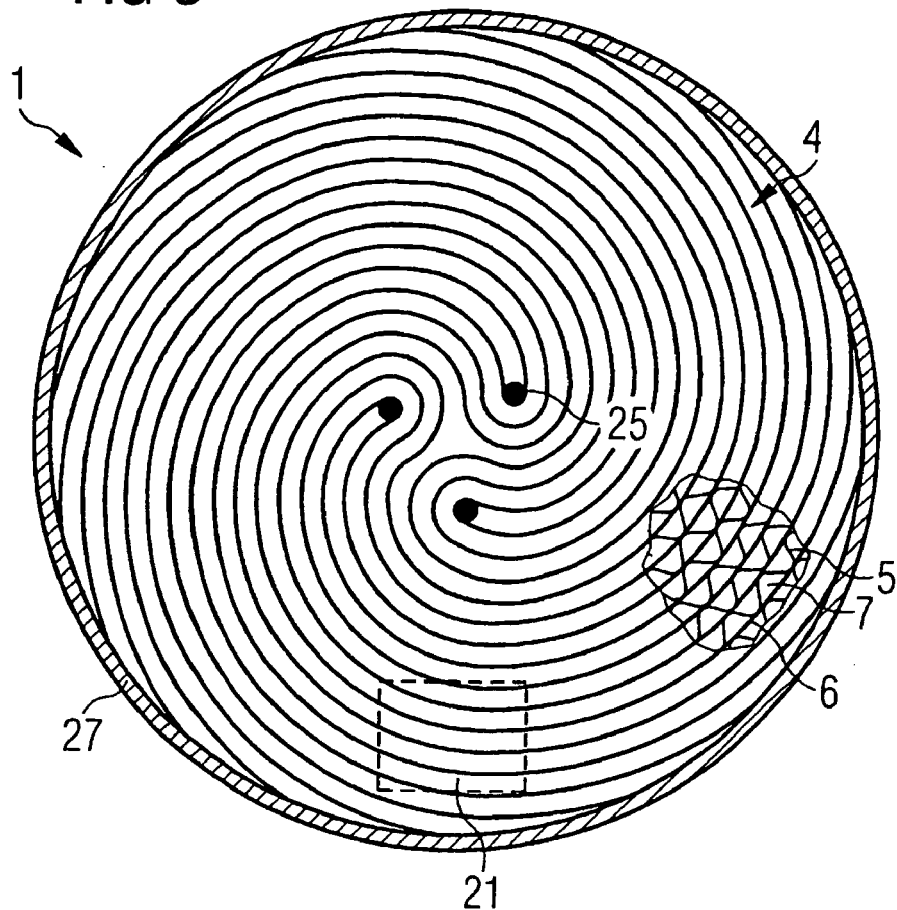
FIG. 3 is a partly-sectional, end-elevational view of an embodiment of a particulate filter.

FIG. 3 diagrammatically depicts an end-elevational view of an embodiment of a particulate filter 1. The latter includes a honeycomb body 4 and a casing 27 surrounding this honeycomb body 4. The honeycomb body is constructed from at least partially structured layers which include a plurality of structured metal foils 5 and substantially smooth filter layers 6, that are disposed in such a way that passages 7 through which the exhaust gas can flow are formed. A plurality of supporting pins 25, which are disposed in particular at winding points of the layers, are indicated in the central region of the honeycomb body 4. A passage density 21 of a particulate filter of this type is preferably more than 600 cpsi (cells per square inch).

Figure 4:
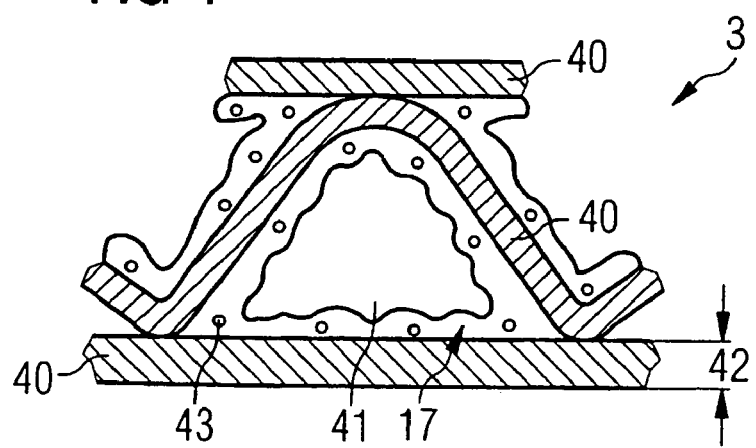
FIG. 4 is a fragmentary, enlarged, sectional view of a portion of an embodiment of a heating element.

FIG. 4 shows a portion of an embodiment of the heating element 3 in section. The heating element 3 in this case is constructed from a plurality of smooth and corrugated metal sheets 40, which are preferably at least in part structured in such a way that cells 41 are formed. The metal sheets have a thickness of less than 30 μm, in particular less than 20 μm and especially less than 12 μm. The cells 41 are provided with a catalytically active coating 17, which includes catalysts 43 such as, for example, platinum.

Figure 5:
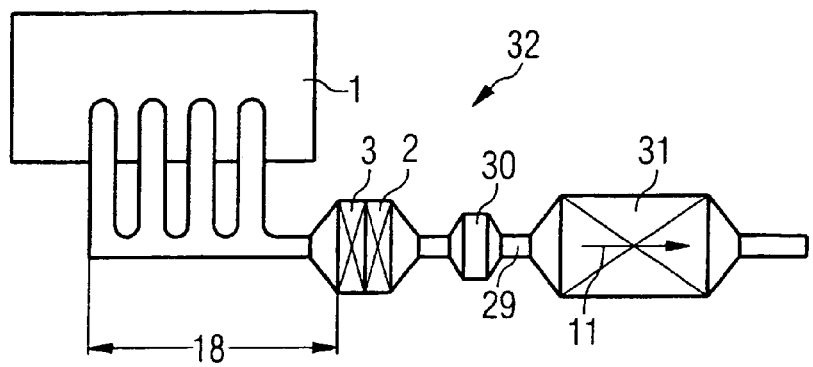
FIG. 5 is an elevational view of a structure of an exhaust system having an embodiment of a system according to the invention.

FIG. 5 diagrammatically depicts the structure of an exhaust system 32 for an internal combustion engine 1. An internal combustion engine 1 of this type is preferably constructed as a diesel engine. As is seen in the flow direction 11 of the exhaust gas, the exhaust system 32 includes the following components:
 an upstream heating element 3, which is constructed as an oxidation catalytic converter;
 a particulate filter 2;
 a turbocharger 30; and
 a catalytic converter 31.

The individual components may be disposed in separate casings or may in part be combined with one another in a single casing and are connected to one another through an exhaust pipe 29. As has already been stated, a combination with the at least one heating element is advantageous in particular if the particulate filter 2 cannot very easily be disposed very close to the internal combustion engine 1. In this respect, in particular a distance 18 from the internal combustion engine 1 of greater than 0.7 m is appropriate. If the distances 18 are shorter, in particular even less than 30 cm, the heating element 3 can, for example, be constructed to be smaller (by using an internal heating wire, and an extremely narrow disk, etc.). With the individual components disposed in this way, first of all a sufficient quantity of nitrogen dioxide is made available with the aid of the heating element 3, which is constructed as an oxidation catalytic converter. This nitrogen dioxide, in the immediately downstream particulate filter 2, is responsible for (continuously) regenerating the accumulated soot particles. The downstream catalytic converter 31 may, for example, also be constructed as a hybrid converter having partial regions with different heat capacities. In this case, this converter is to be constructed in such a way that its heat capacity increases in the direction of flow.

Figure 6:
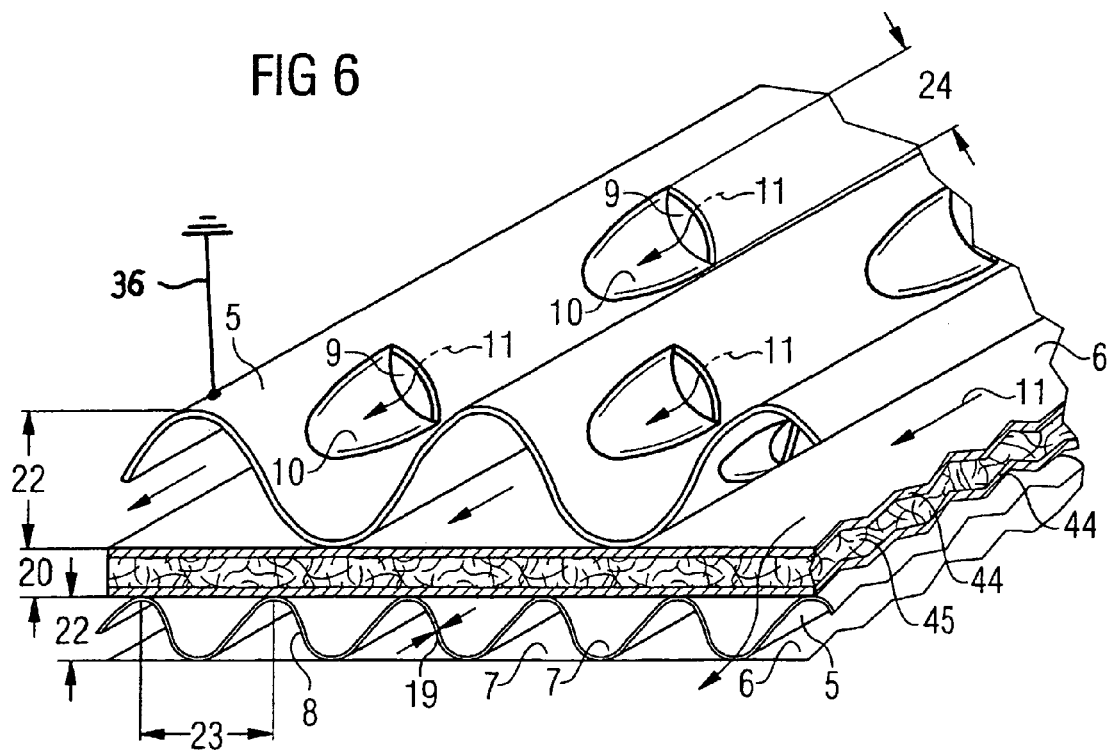
FIG. 6 is a fragmentary, enlarged, perspective view of a portion of an embodiment of an open particulate filter.

FIG. 6 shows a diagrammatic and perspective illustration of a portion of a further embodiment of the particulate filter 2 according to the invention. The particulate filter 2 in this case includes metal foils 5, between each two of which there is a filter layer 6. In the illustrated embodiment, the filter layer 6 is formed with two metal layers 44 and a fiber layer 45 disposed between them. These layers are connected by technical joining in a boundary region, which cannot be seen due to the sectional illustration. The preferred manner of producing the technical joining connection is by brazing. However, a sintering process or even welding may be used as well.

The metal foils 5 have a constant thickness 20 and are provided in this case with a structure 8, while the filter layer 6 has a substantially smooth surface. This structure of the metal foils 5 forms passages 7 through which an exhaust gas can flow in a flow direction 11. The metal foils 5 in this case have different structure heights 22 and structure lengths 23, so that the passages 7 which are formed are matched to the characteristics of the incoming flow of exhaust gas. The embodiment illustrated herein substantially shows a portion of an open filter body. The metal foils 5 are provided with apertures 9 and diverting surfaces 10 which are responsible for diverting the exhaust-gas stream toward the filter layer 6. This produces pressure differences which cause partial exhaust-gas streams to penetrate through the filter layer 6, so that soot particulates or the like stick to or accumulate in the fiber layer 45. It is advantageous for the apertures 9 to each have a diameter 24 which is approximately in a range between 2 mm and 6 mm. Electrodes 36 are connected to the metal foil 5 so as to provide at least one heating element in the interior of the particulate filter.

Figure 7:
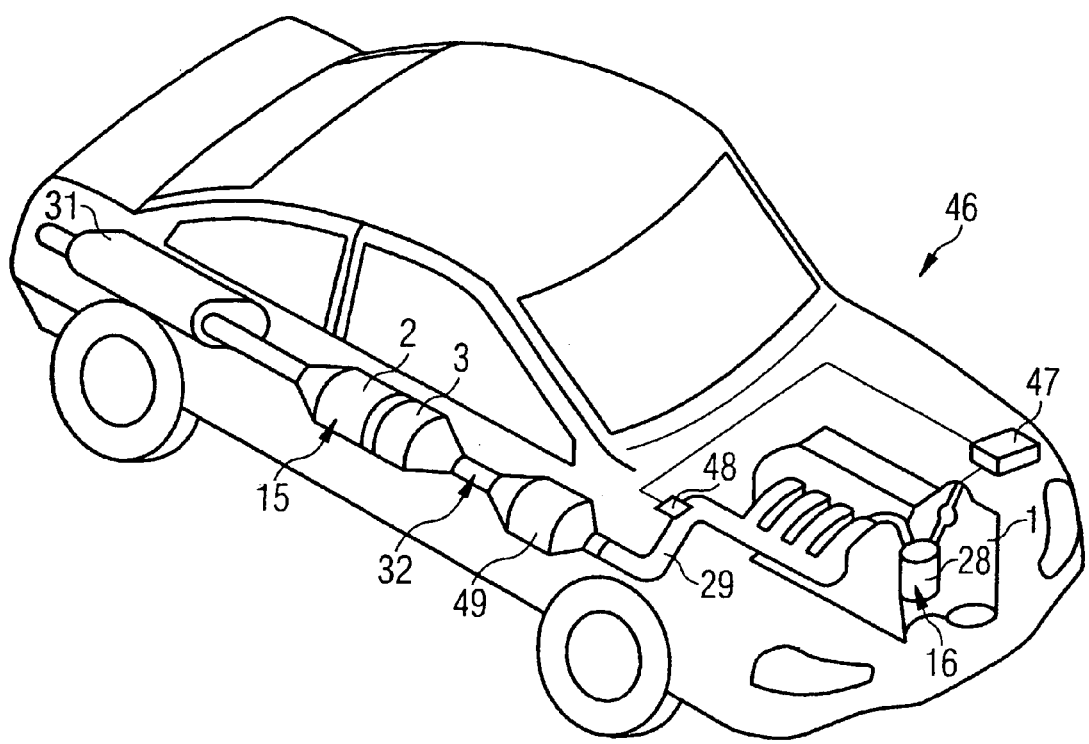
FIG. 7 is a perspective illustration of the structure of an exhaust installation in an automobile.

FIG. 7 diagrammatically depicts the structure of an exhaust system 32 in an automobile 46. The automobile 46 has an internal combustion engine 1 with a plurality of cylinders 28, which together define a displacement volume 16. The exhaust gas which is generated by combustion of a fuel/air mixture is fed through an exhaust pipe 29 firstly to an oxidation catalytic converter 49 and then to the system according to the invention, including a heating element 3 and an open particulate filter 2. The heating element 3 and the particulate filter 2 together have a total volume 15 which is constructed to be significantly smaller than the displacement volume 16 of the internal combustion engine 1. Finally, the exhaust gas flows through a catalytic converter 31, which preferably has muffling components. Moreover, the internal combustion engine 1 is connected to an engine management system 47, which advantageously communicates with a large number of sensor 48. The heating element 3 is preferably controlled or regulated on the basis of values which can be determined through the use of the sensors 48.

For example, the illustrated sensor 48 is constructed as a temperature sensor which records the temperature of the exhaust-gas stream in the exhaust pipe 29. A memory of the engine management system 47 stores a limit value, with the heating element 3 being supplied with current when the exhaust-gas temperature which is determined is below the limit value.

The proposed system for purifying or cleaning exhaust gases from mobile internal combustion engines, in particular for eliminating soot particulates as are found in exhaust-gas streams from diesel engines, allows continuous regeneration of the open particulate filter even at positions which are far removed from the internal combustion engine. In this context, the system is distinguished by a very low pressure loss and a high efficiency.

I claim:

1. A system for cleaning exhaust gases from mobile internal combustion engines, comprising:
    at least one open particulate filter having a freedom of flow of at least 20%, said particulate filter including at least one honeycomb body made from at least partially structured layers including at least one metal foil having a structure and at least one filter layer, forming passages through which the exhaust gas can flow, said metal foil having at least one of openings and diverting surfaces diverting partial exhaust-gas streams toward said at least one filter layer; and
    at least one heating element.

2. The system according to claim 1, wherein said at least one filter layer has a mean porosity of at least 70%.

3. The system according to claim 1, wherein said at least one filter layer has a mean porosity of at least 85%.

4. The system according to claim 1, wherein said at least one filter layer has a mean porosity of greater than 95%.

5. The system according to claim 1, wherein said at least one heating element is disposed in an interior of said at least one particulate filter.

6. The system according to claim 1, wherein the internal combustion engine has a displacement volume, and said at least one particulate filter and said at least one heating element together have a total volume of less than 80% of said displacement volume.

7. The system according to claim 1, wherein the internal combustion engine has a displacement volume, and said at least one particulate filter and said at least one heating element together have a total volume of less than 50% of said displacement volume.

8. The system according to claim 1, wherein the internal combustion engine has a displacement volume, and said at least one particulate filter and said at least one heating element together have a total volume of less than 10% of said displacement volume.

9. The system according to claim 1, wherein said at least one heating element is at least in part provided with a catalytically active coating.

10. The system according to claim 1, wherein said at least one heating element is at least in part provided with a catalytically active oxidizing coating.

11. The system according to claim 1, wherein said at least one particulate filter and said at least one heating element are disposed at a distance of greater than 0.7 m from the internal combustion engine.

12. The system according to claim 1, wherein said at least one particulate filter is disposed at a distance of greater than 0.7 m from the internal combustion engine.

13. The system according to claim 1, wherein said at least one heating element is disposed at a distance of greater than 0.7 m from the internal combustion engine.

14. The system according to claim 1, wherein said at least one heating element is constructed as a separate heating disk connected upstream of said at least one particulate filter, in flow direction of the exhaust gas.

15. The system according to claim 14, wherein said at least one heating element constructed as a heating disk is supported against said at least one particulate filter.

16. The system according to claim 14, wherein said at least one particulate filter has an axial extent, and said at least one heating element constructed as a heating disk has a length of less than 60% of said axial extent.

17. The system according to claim 14, wherein said at least one particulate filter has an axial extent, and said at least one heating element constructed as a heating disk has a length of less than 40% of said axial extent.

18. The system according to claim 14, wherein said at least one particulate filter has an axial extent, and said at least one heating element constructed as a heating disk has a length of less than 20% of said axial extent.

19. A system for cleaning exhaust gases from mobile internal combustion diesel engines, comprising;
    at least one open particulate filter having a freedom of flow of at least 20% for receiving diesel exhaust gases, said particulate filter including at least one honeycomb body made from at least partially structured layers including at least one metal foil having a structure and at least one filter layer, forming passages through which the exhaust gas can flow, said metal foil having at least one of openings and diverting surfaces diverting partial exhaust-gas streams toward said at least one filter layer; and
    at least one heating element for receiving the diesel exhaust gases.

* * * * *